Sheet 1, 4 Sheets.

O. S. Chapman.

Excavating Mach.

No. 4,039. Reissued Jun. 21, 1870.

Witnesses:
Geo. I. Bergen
R. T. Dodge

Inventor:
O. S. Chapman
By Dodge & Munn
Attorneys

O. S. Chapman.
Excavating Mach.
No. 4,039. Reissued Jan. 21, 1870.
Fig. 2.
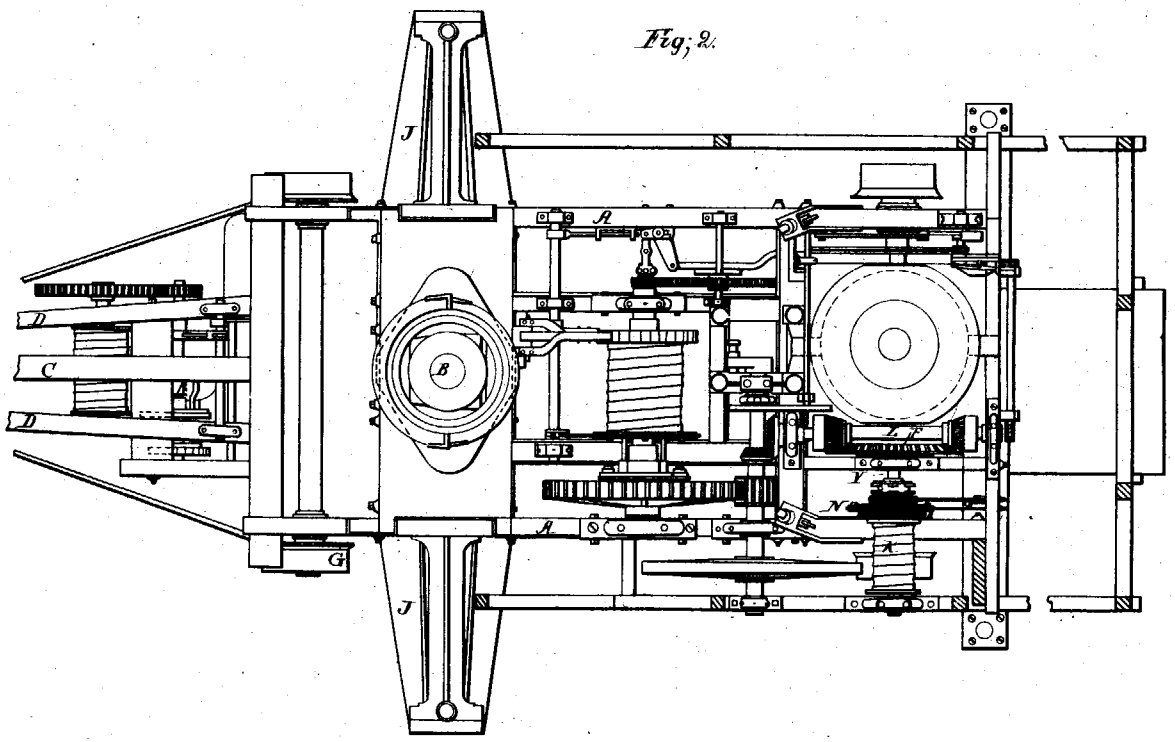
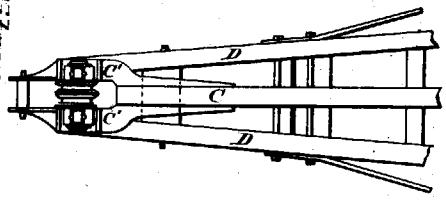
Witnesses;
Geo. S. Bergen
P. S. Dodge
Inventor;
O. S. Chapman
By Dodge & Munn
attorneys

O. S. Chapman.
Excavating Mach.
No. 4,039. Reissued Jun. 21, 1870.
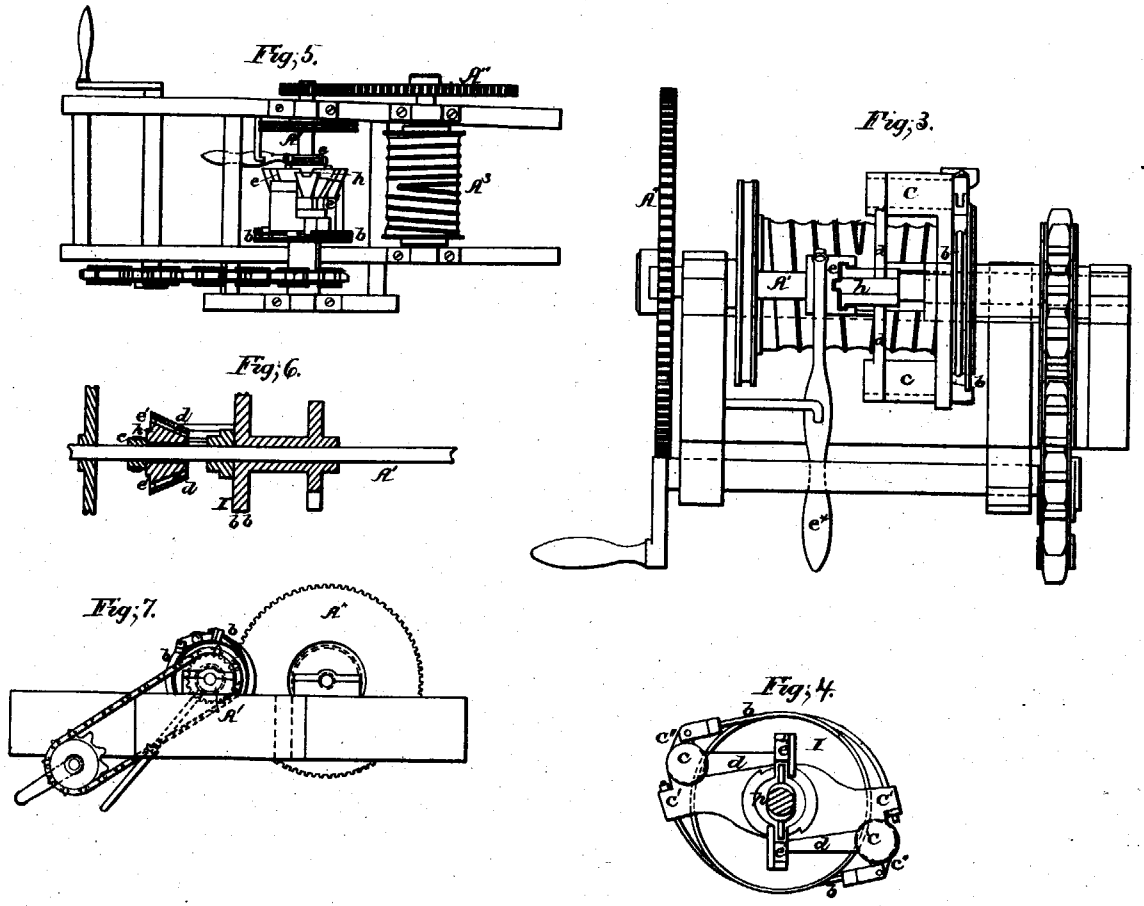
Witnesses:
Geo. J. Bergen
P. J. Dodge
Inventor;
O. S. Chapman
By Dodge & Munn
Attorneys Sheet 4, 4 Sheets.

O. S. Chapman.

Excavating Mach.

No. 4,039.

Reissued Jun. 21, 1870.

Witnesses;
Geo. I. Bergen
P. T. Dodge

Inventor;
O. S. Chapman
By Dodge & Munn
attorneys

United States Patent Office.

OLIVER S. CHAPMAN, OF CANTON, MASSACHUSETTS.

*Letters Patent No.* 63,857, *dated April* 16, 1867; *reissue No.* 4,039, *dated June* 21, 1870.

DIVISION B.

IMPROVEMENT IN EXCAVATING-MACHINES.

The Schedule referred to in these Letters Patent and making part of the same

*To all whom it may concern:*

Be it known that I, OLIVER S. CHAPMAN, of Canton, in the county of Norfork and State of Massachusetts, have invented certain new and useful Improvements in Excavating-Machines; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

My invention relates to excavators, and consists in the peculiar construction and manner of securing the main post on which the crane or swinging arm is supported and moves, as hereinafter more fully described.

Figure 8 is a longitudinal vertical section of the post, with its supporting-socket and collar, and a portion of the frame of the machine.

Figure 10 is a horizontal cross-section taken on the line *x x*, fig. 8.

Figure 14 is an elevation, partly in section, showing the manner of securing the braces to the main frame at the bottom.

Figure 16 is a cross-section of the post on the line *y y* of fig. 8, showing the internal strengthening ribs.

Figure 1:
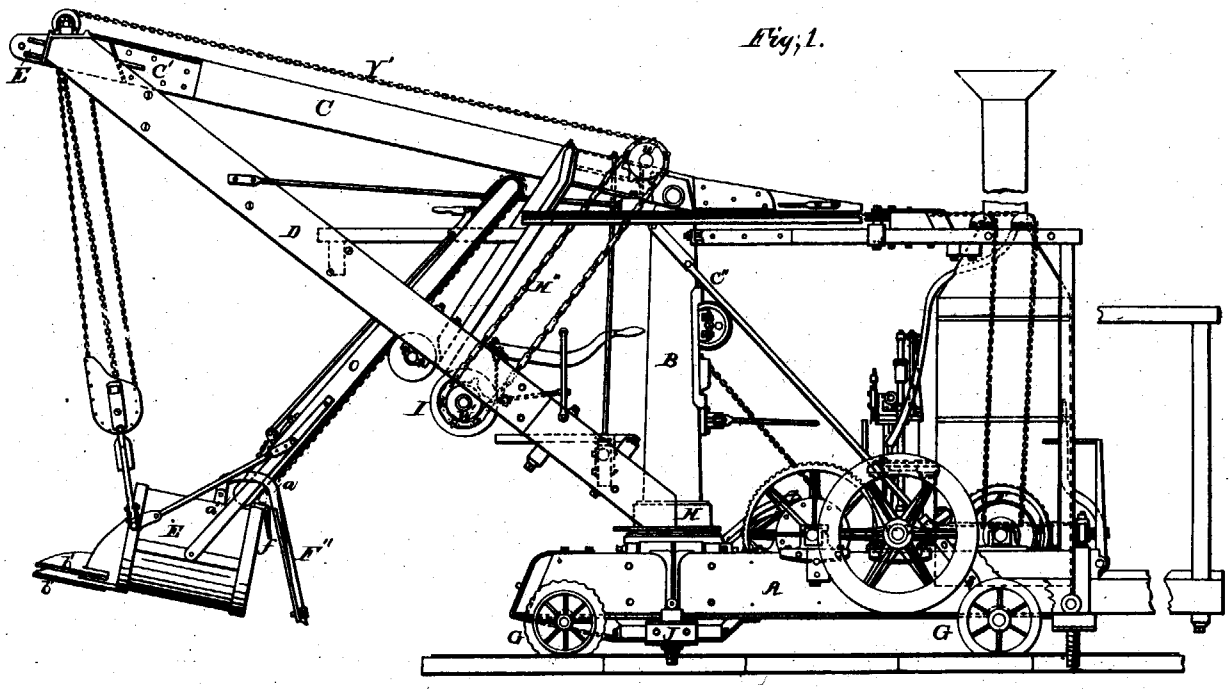
Figure 1 is a side elevation of the machine complete.

It has been customary heretofore, in constructing this class of machines, to make the main post B of wood, and while the machines were of a comparatively small size, these wooden posts answered tolerably well, though requiring frequent repairs and replacement by new posts. Since the recent improvements in these machines, by which their size and capacity have been greatly increased, the wooden posts formerly used have proved insufficient, they enduring but for a few weeks, necessitating frequent stoppages for repairs, and thus necessarily putting a stop to all operations while waiting for the repairs to be effected, thereby entailing much loss and expense. It is to remedy these difficulties or objections that my present invention is devised.

This post B I construct of cast-iron, in the form of a tubular pillar or column, as shown in vertical section in fig. 8.

In order to give to it the requisite strength, without rendering it too heavy, I construct it with internal ribs or flanges, *o'*, as shown in figs. 8 and 16.

At the top it is cast with a neck or shoulder to receive the collar which supports the crane, and permits it to turn on the post B. The journal thus formed at the upper end of the post is turned off smooth, and has a steel ring, *o''*, shrunk onto it, for the twofold purpose of giving it strength and preventing it from breaking, and also to prevent the rapid wear at that point.

The post thus made is secured in position by means of the socket B', which rests on the cross-bar J of the main frame, and supported by truss-rods *p*, as shown in fig. 8.

A strong circular collar, B'', is bolted firmly to the cross-bars above J, and has a hole of proper size to receive the post B, the post being slightly tapering from the top of the collar B'' to its lower end, so that it will fit snugly in place, and can be readily removed when desired.

At the point where the braces C'' are connected to the post B, near its upper end, recesses are made in the post, as shown in section in fig. 10, which is a cross-section of the post taken on the line *x x* of fig. 8.

The braces C'' are provided with lugs forged solid thereon, of proper size to fill these recesses, so that when the braces are bolted to the post, the lugs receive the strain, and thus unite the post and braces firmly, and at the same time relieve the bolts from the excessive strain, which would otherwise be thrown upon them, and by which they were frequently broken, as formerly used.

The lower end of the brace C'' I attach to the side-bars of the main frame by a stirrup, S, which passes entirely around the side-bar A, as shown in fig. 14.

As these braces have to receive a heavy downward thrust when the crane is swung around to either side, and also a heavy upward strain when the crane is swung in the opposite direction, and as this alternate pulling and thrusting soon loosens or breaks the bolts by which the stirrup is secured to the frame, I avoid their use by placing on the upper edge of the bar A a heavy metallic plate, P, having a lug, *y*, projecting from its upper face, as shown in fig. 14, and then secure the stirrup by means of a strong key, *l*, which receives the force of the downward thrust, and by means of which the stirrup can be tightened up whenever necessary. By these means I prevent the strain from being thrown upon the bolts which heretofore pressed through the stirrup and the bar A and transfer the entire upward strain to the under side of the bar A, where the stirrup has a broad, flat bearing, the downward strain or thrust being in like manner transferred to the plate P, which has a still larger bearing on the upper surface of the bar A.

By these means, I dispense with the use of bolts to hold the stirrup S in place, the key *l*, either alone or with a single bolt, amply sufficing for that purpose.

When bolts were used for this purpose, the boring of holes through the stirrup and the bar for their reception weakened those parts, and this difficulty was greatly aggravated, so far as the bar was concerned, by the alternate pulling and thrusting on them, which soon caused them to wear large holes in the bar A, the latter thereby being so worn and weakened as soon to give way, or break, and thus render the machine useless for the time being, and necessitate the stoppage of its use for repairs.

By the method herein described of securing the braces to the bar A, I obviate these difficulties entirely, and so improve the machine as to render it far more durable and serviceable.

As shown in fig. 1, the chair Y′, which serves to raise and lower the shovel E, passes along on top of the crane C over a wheel on the same shaft with the sprocket-wheel *w*, thence down into the interior of the post B, thence out through a slot, I, in the rear side of the post, under a wheel or pulley, B*, and down to the drum C* on the main frame of the machine.

As the forming of the slot $o^3$, through which the chain Y′ passes, tends to weaken the post B at that point, I form a flange or projection, $o^3$, around the edges of the slot on the outside of the post, as shown in fig. 1; this projection also forming a bearing for securing the pulley B* to.

At the lower end of the slot I′, where the chain Y′ enters the post from below, a projecting mouth-piece or guard, $n^2$, is secured to prevent wear by the chain.

By this method of constructing the post B, and securing it in place, the machine is rendered far more durable and efficient, and by this plan, also, the post can be made and fitted complete at the factory, and sent wherever desired, and, with but trifling delay and labor, be inserted in a machine in place of a worn out or broken post, it being understood, of course, that the posts, with their sockets, collars, and braces, are so made as to fit any other machine of the same size or class. Thus I obviate the necessity of sending a machine to the factory to be repaired, as these parts can be sent wherever the machine may happen to be, and then be substituted for broken ones, with but trifling delay.

Having thus described my invention,

What I claim is—

1. The ribbed metallic post B, constructed substantially as herein described, to adapt it for use in an excavating machine, as set forth.

2. In combination with said post the socket B′ and collar B″, when arranged to hold said post in position, substantially as described.

3. The combination of the stirrup S, plate P, and key *l*, with the bar A, for securing the brace to the frame, as set forth.

OLIVER S. CHAPMAN.

Witnesses:

PHIL. T. DODGE,

W. C. DODGE.